United States Patent
Morgado

(10) Patent No.: US 12,378,785 B2
(45) Date of Patent: Aug. 5, 2025

(54) CONCRETE PUMP EQUIPPED WITH HAZARD DETECTION MEANS

(71) Applicant: QUALI PARTS & SERVICES, Montbequi (FR)

(72) Inventor: Nelson Morgado, Latour Bas Elne (FR)

(73) Assignee: QUALI PARTS & SERVICES, Montbequi (FR)

(*) Notice: Subject to any disclaimer, the term of this patent is extended or adjusted under 35 U.S.C. 154(b) by 153 days.

(21) Appl. No.: 17/773,925

(22) PCT Filed: Oct. 20, 2020

(86) PCT No.: PCT/EP2020/079446
§ 371 (c)(1),
(2) Date: May 3, 2022

(87) PCT Pub. No.: WO2021/089316
PCT Pub. Date: May 14, 2021

(65) Prior Publication Data
US 2022/0364378 A1 Nov. 17, 2022

(30) Foreign Application Priority Data
Nov. 4, 2019 (FR) ...................................... 1912331

(51) Int. Cl.
*E04G 21/04* (2006.01)
*G01S 15/88* (2006.01)

(52) U.S. Cl.
CPC ..... *E04G 21/0463* (2013.01); *E04G 21/0436* (2013.01); *G01S 15/88* (2013.01)

(58) Field of Classification Search
CPC . E04G 21/04; E04G 21/0427; E04G 21/0436; E04G 21/0445; E04G 21/0454; E04G 21/0463; G01S 15/88
See application file for complete search history.

(56) References Cited

U.S. PATENT DOCUMENTS

| 5,330,327 A * | 7/1994 | Anderson ............. F04B 49/065 417/279 |
| 6,202,013 B1 * | 3/2001 | Anderson ........... E04G 21/0436 701/50 |

(Continued)

FOREIGN PATENT DOCUMENTS

| DE | 10320382 A1 | 12/2004 |
| DE | 102008017961 A1 | 10/2009 |

(Continued)

OTHER PUBLICATIONS https://web.archive.org/web/20181016121645/https://en.wikipedia.org/wiki/Anemometer (Year: 2018).*

(Continued)

*Primary Examiner* — Aaron L Troost
(74) *Attorney, Agent, or Firm* — Seckel IP, PLLC

(57) ABSTRACT

A concrete pump (1) includes a first frame (2a) equipped with a hopper (5) intended to receive the concrete, feet (13) for stabilizing the concrete pump (1) and a turret (10) carrying an articulated boom (6) comprising a plurality of arms (7). The articulated boom (6) carries at least one pipe (6a) for conveying the concrete between the hopper (5) and a concrete delivery location. The concrete pump (1) is equipped with any one of at least a first device for detecting cavities in the ground, a second device (22) for detecting an inclination of at least one arm (7) relative to a vertical axis (A2), a third device for detecting the deployment of the feet (13), a fourth device for detecting an attitude of the concrete pump (1) and a rotation sensor equipping the turret (10).

14 Claims, 3 Drawing Sheets

(56) References Cited

U.S. PATENT DOCUMENTS

| | | | | |
|---|---|---|---|---|
| 2010/0253044 | A1* | 10/2010 | Benz | B62D 49/08 |
| | | | | 280/433 |
| 2015/0112555 | A1* | 4/2015 | Yi | E04G 21/0436 |
| | | | | 701/50 |
| 2017/0144635 | A1 | 5/2017 | Mayer et al. | |
| 2017/0204886 | A1 | 7/2017 | Wang et al. | |
| 2020/0003239 | A1* | 1/2020 | Wang | F15B 11/003 |
| 2020/0392746 | A1* | 12/2020 | Bertram | B25J 9/1689 |
| 2021/0404195 | A1* | 12/2021 | Huth | E04G 21/025 |

FOREIGN PATENT DOCUMENTS

| | | |
|---|---|---|
| EP | 2813643 A1 | 12/2014 |
| EP | 3556718 A1 | 10/2019 |
| JP | H06-330628 A | 11/1994 |
| JP | 2005-148968 A | 6/2005 |
| JP | 2007-120959 A | 5/2007 |
| JP | 2017-530273 A | 10/2017 |
| JP | 2018-095372 A | 6/2018 |
| WO | 2016016305 A1 | 2/2016 |

OTHER PUBLICATIONS

International Search Report and Written Opinion dated Jan. 18, 2021 in counterpart application No. PCT/EP2020/079446; w/English partial translation and partial machine translation (total 18 pages).
Japanese Office Action dated Oct. 1, 2024 in counterpart application No. JP 2022-526061; w/English Machine translation (total 13 pages).
Korean Office Action dated Feb. 11, 2025 in counterpart application No. KR 9-5-2025-014402969; w/English machine translation (total 15 pages).

\* cited by examiner

CONCRETE PUMP EQUIPPED WITH HAZARD DETECTION MEANS

The present invention relates to a concrete pump equipped with hazard detection means.

In the field of civil engineering, concrete pumps are known that are intended to deliver concrete to a concrete delivery location. The concrete pump comprises a false chassis equipped with a hopper for receiving the concrete produced by a concrete mixer and a machine for pumping the concrete that is designed to convey the concrete from the hopper to the concrete delivery location. The pumping machine comprises a channel provided with pipes and a hose inside which the concrete flows and pumping means for propelling the concrete inside the pumps and hose.

The concrete delivery location is liable to be remote from a possible stabilization location for the concrete pump. Thus the concrete pump comprises an articulated boom carrying the pipes and hose that is able to be deployed between the concrete pump and the concrete delivery location. The articulated boom in the deployed position usually has a length of several tens of meters. Reference can be made for example to the document EP3556718, which describes a concrete pump of the aforementioned type.

Such concrete pumps regularly suffer accidents that are due to the presence of several hazards existing in an environment in which the concrete pump is located.

A first hazard lies in a lack of stabilization of the concrete pump, which is liable to cause the concrete pump to be tipped over. Equipping the concrete pump with stabilizing feet is known, which are able to be positioned on either side of a longitudinal axis of the concrete pump between the latter and the ground. Nevertheless these feet are liable to be badly positioned and to be unsuitable for preventing a detrimental tipping of the concrete pump.

A second hazard lies in the nature of the ground on which the concrete pump is resting. This is because the ground is liable to contain more or less numerous large cavities that may cause collapse of the ground when the concrete pump, loaded with concrete in particular, is placed on top. Such a collapse of the ground is also liable to cause detrimental tipping of the concrete pump.

A third hazard lies in the presence of wind, which is liable to exert a high force on the articulated boom of the concrete pump. Such a force may also cause detrimental tipping of the concrete pump, in particular when the wind reaches a speed equal to or greater than 70 km/h.

A fourth hazard lies in the presence of electric lines in proximity to the concrete pump. Such electric lines form a magnetic field in their environment that is liable to create an electric arc with the articulated boom if the latter enters this environment. The electric arc generated is liable to damage the concrete pump, or even to cause burns or electrocutions of a user of the concrete pump and/or persons present in the vicinity.

The aim of the present invention is to propose a concrete pump that makes it possible to guard against all these hazards.

A concrete pump of the present invention is a concrete pump comprising a first chassis equipped with a hopper intended to receive the concrete, feet for stabilizing the concrete pump and a turret carrying an articulated boom including a plurality of arms. The articulated boom carries at least one pipe intended to convey the concrete between the hopper and a concrete delivery location. The first chassis is normally referred to as a false chassis.

According to the present invention, the concrete pump is equipped with at least any one of a first device for detecting cavities in the ground, a second device for detecting an inclination of at least one arm with respect to a vertical axis, a third device for detecting a deployment of the feet, a fourth device for detecting the trim of the concrete pump and a rotation sensor equipping the turret.

The concrete pump advantageously comprises at least any one of the following technical features taken alone or in combination:
- the concrete pump comprises means for computing from information supplied by the first detection device, by the second detection device, by the third detection device, by the fourth detection device and by the rotation sensor to determine a center of gravity of the concrete pump and to check that the center of gravity of the concrete pump is contained within a previously determined volume,
- the computing means are configured for determining whether the center of gravity of the concrete pump is contained within an area bounded by the respective ends of the feet,
- the concrete pump is equipped with a fifth device for detecting a concrete agglomerate inside the pipe,
- the concrete pump is equipped with a sixth device for detecting electric lines,
- the concrete pump is equipped an anemometer,
- the computing means are connected with alert means that are able to deliver alert information to a user of the concrete pump and/or to block operation of the concrete pump,
- the concrete pump is equipped with wheels,
- the concrete pump is equipped with tracks,
- the concrete pump is a trailer intended to be pulled by a motor vehicle comprising a second chassis able to receive the first chassis by securing.

The invention will be understood better from the reading of the following non-limitative description, drafted with regard to the accompanying drawings, wherein.

Figure 1:
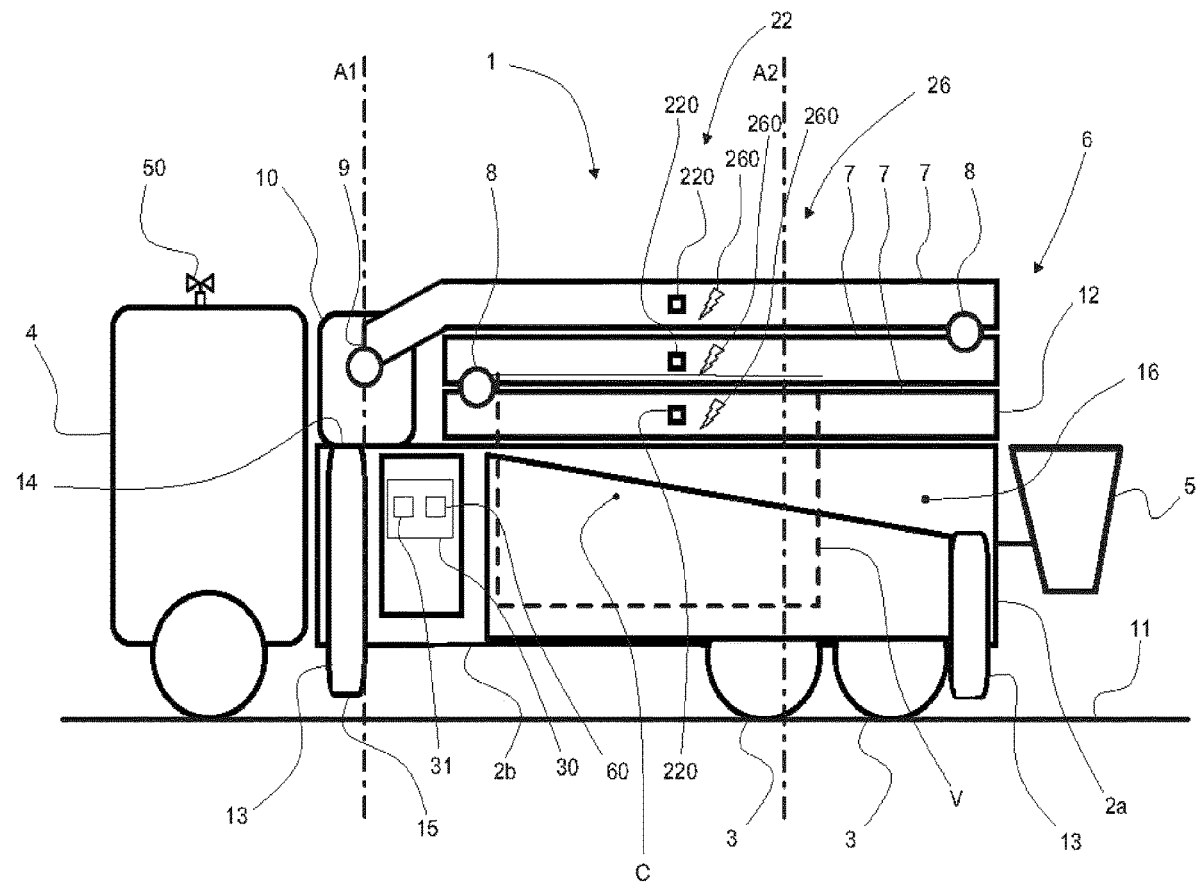
FIG. 1 shows schematically a first side view of the concrete pump of the present invention that comprises a boom in the folded position.

The figures show a concrete pump 1 according to the present invention. The concrete pump 1 comprises a first chassis 2a that is, in the example illustrated, carried by a second chassis 2b of a vehicle. The first chassis 2a of the concrete pump 1 is normally referred to as a false chassis and is able to attached to the second chassis 2b of the vehicle. The vehicle is provided with a cab 4 and drive means to enable it to move.

The concrete pump 1 is equipped with wheels 3 to enable it to run. According to another variant embodiment, the concrete pump 1 is provided with tracks that allow movement of the concrete pump on a more chaotic ground.

The first chassis 2a is equipped with a hopper 5 intended to receive the concrete coming from a concrete mixer for example. The hopper 5 is in particular secured to the rear of the first chassis 2a.

Figure 2:
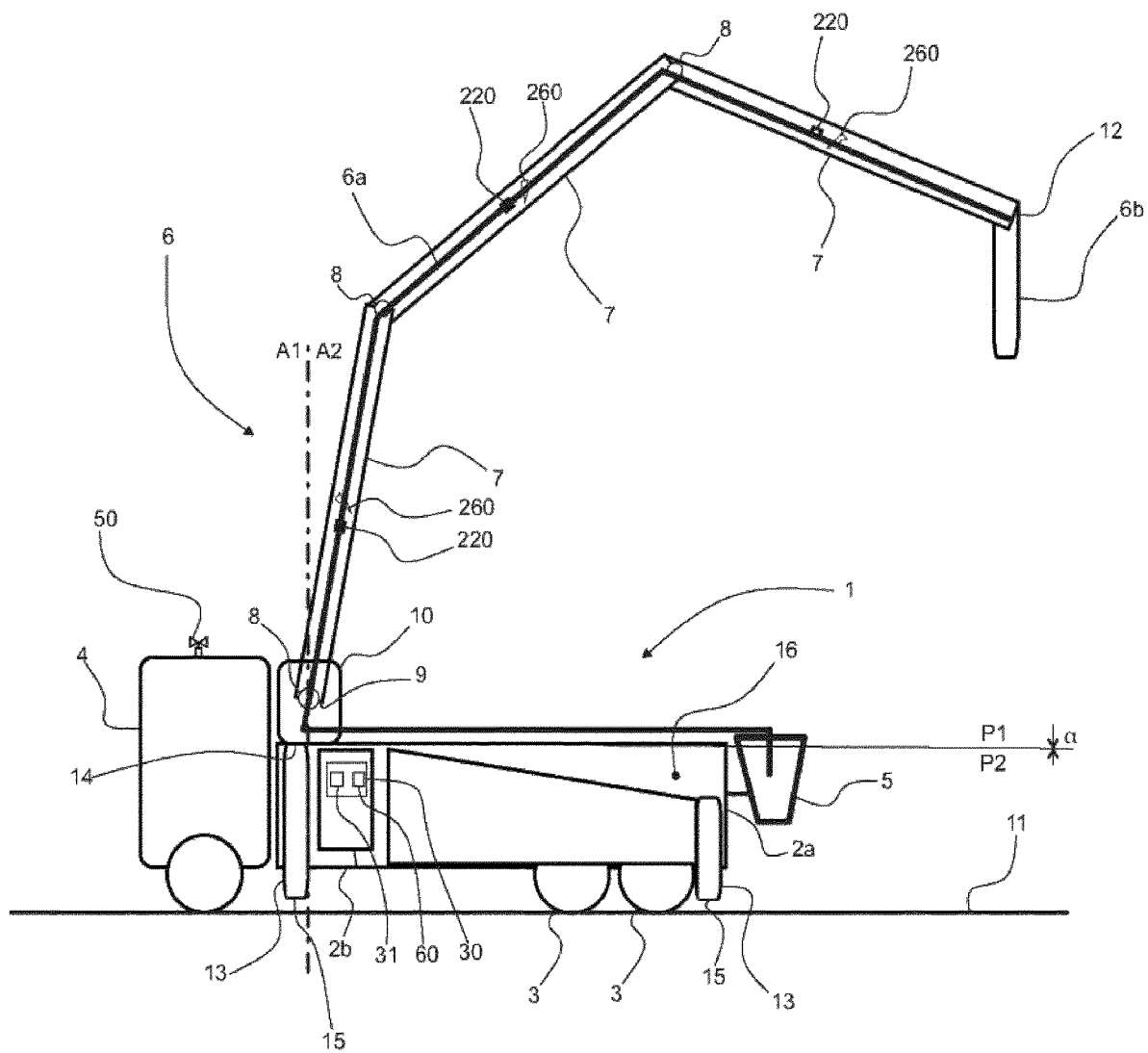
FIG. 2 shows schematically a second side view of the concrete pump illustrated in FIG. 1 wherein the boom is placed in the position of use.

The first chassis 2a is also equipped with a boom 6 that carries a pipe 6a, shown schematically on FIG. 2. The pipe 6a is in particular an assembly of tubes inside which the concrete is able to flow from the hopper 5 as far as a concrete-delivery location located on a construction site. To facilitate delivery of the concrete to the delivery location, one end of the pipe 6a is equipped with a hose 6b. The boom 6 is preferentially articulated and for this purpose includes a plurality of arms 7 joined in pairs by their respective ends. Thus the boom 6 is able to move between a storage position, as shown in FIG. 1, wherein the boom 6 is folded, and a use position, as shown in FIG. 2, wherein the boom 6 is deployed. For this purpose, the arms 7 are provided with means 8 for articulating two arms 7 in pairs. According to the example illustrated, the number of arms 7 that the boom 6 has is equal to three but this number is able to be any one. The boom 6 includes a proximal end 9 that is connected to a turret 10. The turret 10 is able to rotate on itself on the first chassis 2a about a rotation axis Al substantially orthogonal to a surface of the ground 11 on which the concrete pump rests. These arrangements are such that, when the boom 6 is deployed, a distal end 12 of the boom 6, opposite to the proximal end 9, is able to reach the relatively distant concrete delivery location.

Figure 3:
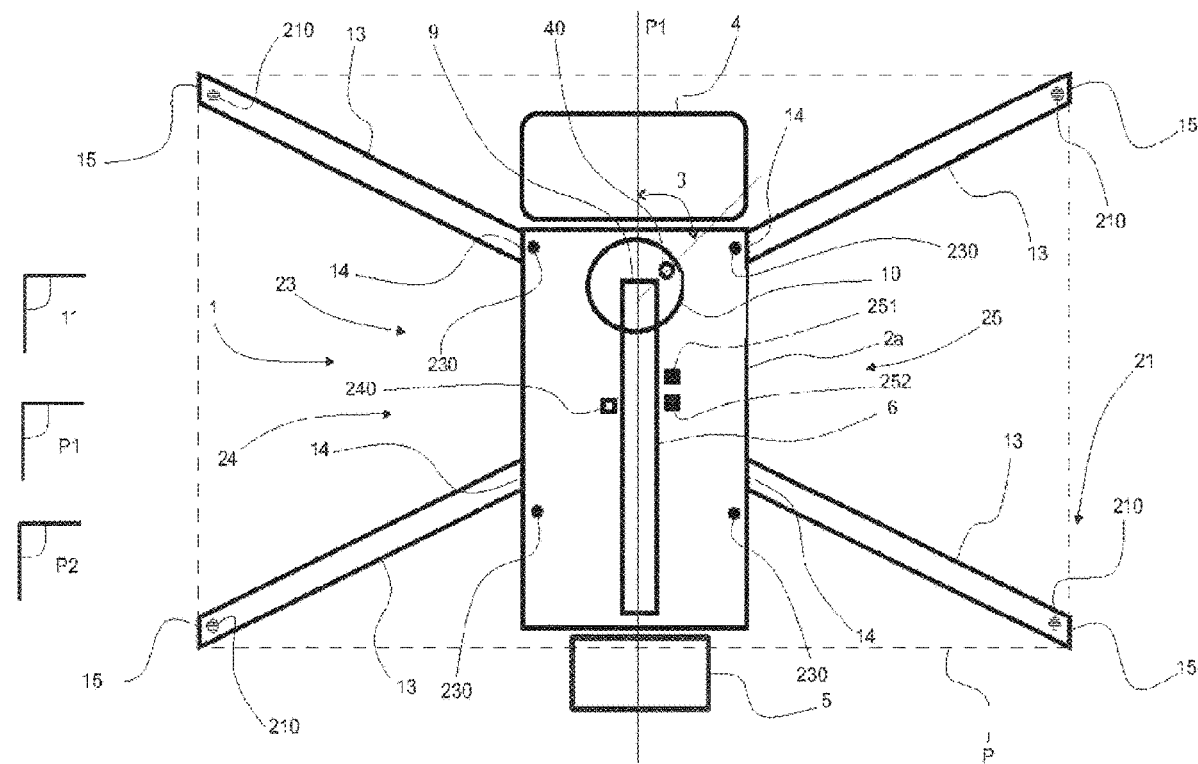
FIG. 3 shows schematically a plan view of the concrete pump illustrated on FIGS. 1 and 2.

The first chassis 2 is also equipped with a plurality of feet 13 that are able to move between a folded position, shown on FIGS. 1 and 2, and a deployed position, shown on FIG. 3. In the folded position, a first end 14 of each foot 13 is connected to the chassis 1 while a second end 15 of the same foot 13 is free. In the deployed position, the first end 14 of each foot 13 is connected to the chassis 2 while the second end 15 of the same foot 13 rests on the surface of the ground 11. The feet 13 are preferably telescopic so as to be easily modified between the deployed position and the folded position and vice-versa.

The first chassis 2a is also equipped with means 16 for pumping the concrete that is provided for conveying the concrete from the hopper 5 to the concrete delivery location.

In order to avoid the concrete pump 1 being tipped over, the concrete pump 1 is equipped with a first device 21 for detecting cavities in the ground, such as a sonar or the like. The first detection device 21 is in particular able to probe the ground to a depth of five meters to identify one or more cavities and to determine whether the ground is able to support a pressure exerted by the concrete pump 1 as well as jolts caused by the pumping means 16. The first detection device 21 preferably comprises sonar sensors or the like 210 that equip each of the feet 13, and more particularly the second end 15 of each of the feet 13 to be disposed as close as possible to the surface of the ground 11. The first detection device 21 is able to provide a first item of first information X1 relating to the presence of cavities in the ground.

In addition, the concrete pump 1 is equipped with a second device 22 for detecting an inclination of the boom 6 with respect to a vertical axis A2, parallel to terrestrial gravity and parallel to the rotation axis A1. The second detection device 22 comprises a plurality of vertical-inclination sensors 220 that equip each of the arms 7. The vertical-inclination sensors 220 are for example disposed at the middle of each of the arms 7. The vertical-inclination sensors 220 are for example sensors able to measure an inclination of each arm 7 with respect to the vertical axis A2. The second detection device 22 is able to provide a second item of information X2 relating to the vertical inclination of the arms 7 of the boom 6.

In addition, the concrete pump 1 is equipped with a third device 23 for detecting a deployment of the feet 13. The third detection device 23 comprises a plurality of position sensors 230 that for example equip the first chassis 2a, in proximity to the first end 14 of the feet 13. The position sensors 230 are for example optical sensors, laser in particular or the like, which measure a distance between the first chassis 2a and the second end 15 of the feet 13, or even an angle formed between each foot 13 and the first chassis 2a. The third detection device 23 is able to provide a third item of information X3 relating to a deployment of the feet 13.

In addition, the concrete pump 1 is equipped with a fourth device 24 for detecting the trim of the concrete pump 1 with respect to a horizontal plane P1, orthogonal to a direction of the terrestrial gravity and to the vertical axis A2. The fourth detection device 24 comprises at least one vertical-inclination sensor 240 that is able to measure an angle of inclination a formed between the horizontal plane P1 and a general extension plane P2 of the concrete pump 1. It will be noted that, on FIG. 2, the angle of inclination a is zero, the horizontal plane P1 and the general extension plane P2 of the concrete pump 1 being coincident. The fourth detection device 24 is able to provide a fourth item of information X4 relating to the trim of the concrete pump 1.

In addition, the turret 10 is equipped with a rotation sensor 40 that is able to determine a rotation angle β of the turret 10 and/or of the arm 6 that the turret carries with respect to a longitudinal plane P1 of the concrete pump 1.

The concrete pump 1 is equipped with a central unit 30 that comprises computing means 31 able to determine a position of a center of gravity C of the concrete pump 1 and to check whether or not the center of gravity C of the concrete pump 1 is contained within a previously determined volume V. The volume V is at least bounded by a perimeter P that is defined by connecting the second ends 15 of the feet 13. The central unit 30 is in relationship with the first detection device 21, the second detection device 22, the third detection device 23, the fourth detection device 24 and the rotation sensor 40. The computing means 31 are means allowing a dynamic management of the position of the center of gravity C of the concrete pump 1. The computing means 31 preferably have recourse to an artificial intelligence technology for benefitting from the procedure for learning from previous computations. In the case where the center of gravity C of the concrete pump 1 is contained within the volume V, and more particularly within the perimeter P, the concrete pump 1 is made operational. In the contrary case, the concrete pump 1 is made inoperative or limited, in particular from an action on the pumping means 16 and/or on a possibility of deployment of the boom 6. These arrangements aim to avoid a tipping of the concrete pump 1.

Moreover, the concrete pump 1 is equipped with a fifth device 25 for detecting an agglomeration of concrete in the pipe 6a. According to a variant embodiment, the fifth detection device 25 comprises a first hydraulic-pressure sensor 251 disposed at the inlet of the pumping means 16 and a second hydraulic-pressure sensor 252 placed at the outlet of the pumping means 16. The fifth detection device 25 is in relationship with the computing means 31, which are able to determine whether a difference in pressure X5 determined between a first pressure measured by the first hydraulic-pressure sensor 251 and a second pressure measured by the second hydraulic-pressure sensor 252 indicates the presence of an agglomeration of concrete in the pipe 6a. If such is the case, the concrete pump 1 can be made inoperative or a procedure for releasing the agglomeration by successive modifications of the pressure of the pumping means 16 managed by the central unit 30.

Moreover, the concrete pump 1 is equipped with a sixth detection device 26 for detecting electrical lines in a proximity radius in order to avoid the boom 6 being present inside a zone where an electric arc generated by the electrical lines is liable to damage the concrete pump 1. The sixth detection device 26 comprises in particular a plurality of sensors 260 for the presence of electrical lines. The sixth detection device 26 is in relationship with the computing means 31, which are able to determine whether a distance X6 between the boom 6 and the electrical lines reaches a safety distance that is of the order of six meters for a high-voltage electrical line and of the order of three meters for a low-voltage electrical line.

Moreover, the concrete pump 1 is equipped with an anemometer 50 that is able to measure a speed X7 of a wind that strikes the concrete pump 1. The anemometer 50 equips for example the cab 4 of the vehicle but is able to be positioned at any point on the concrete pump 1. The anemometer 50 is in relationship with the computing means 31, which are also able to determine whether, according to the speed of the wind measured by the anemometer 50, the boom 6 can be deployed or not.

The computing means 31 are in relationship with the alert means 60, which are able to deliver alert information to a user of the concrete pump 1 and/or to block and/or limit an operation of the concrete pump 1.

Figure 4:
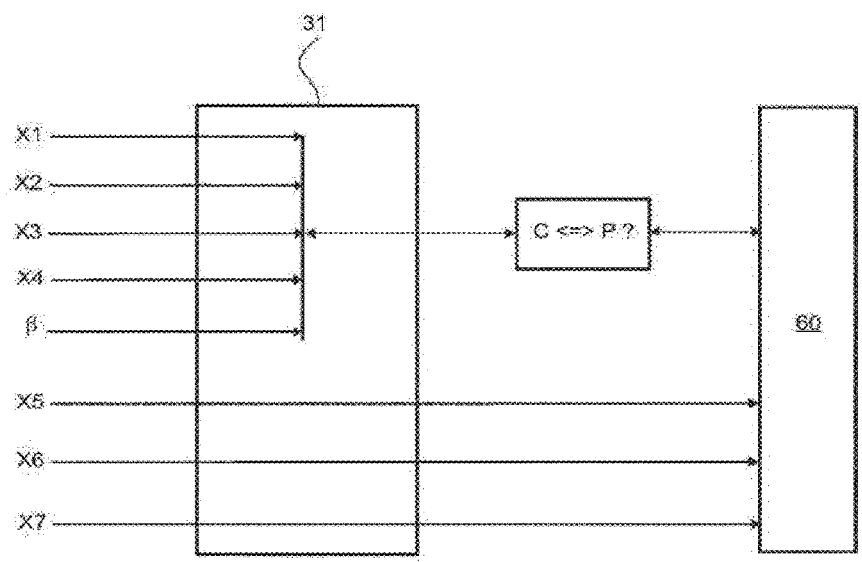
FIG. 4 shows schematically computing means included in the concrete pump illustrated on the preceding figures.

Referring to FIG. 4, the computing means 31 are configured for informing a user of a danger of tipping of the concrete pump 1 from the information X1, X2, X3, X4, β, respectively collected by the first detection device 21, the second detection device 22, the third detection device 23, the fourth detection device 24 and the rotation sensor 40.

Moreover, the computing means 31 are configured for informing a user of a danger of obstruction of the pipe 6a from the pressure difference X5 identified.

Moreover again, the computing means 31 are configured for informing a user of an electromagnetic hazard from the distance X6 between the boom 6 and the electrical lines.

Finally, the computing means 31 are configured for informing a user of a danger of tipping of the concrete pump 1 from the speed X7 of the wind that strikes the concrete pump 1.

The invention claimed is:

1. A concrete pump comprising:
a first chassis equipped with
a hopper intended to receive concrete,
feet for stabilizing the concrete pump,
a turret, and
an articulated boom carried by the turret and including a plurality of arms, the articulated boom carrying at least one pipe intended to convey the concrete between the hopper and a concrete delivery location,
wherein the concrete pump is equipped with
(i) a first device for detecting cavities in the ground, wherein the first device provides information relating to the presence of one or more cavities within a depth of the ground,
(ii) a second device for detecting an inclination of at least one arm with respect to a vertical axis,
(iii) a third device for detecting a deployment of the feet,
(iv) a fourth device for detecting the trim of the concrete pump, and
(v) a rotation sensor equipping the turret.

2. The concrete pump according to claim 1, wherein the concrete pump comprises a computer that computes information supplied by the first detection device, by the second detection device, by the third detection device, by the fourth detection device and/or by the rotation sensor to determine a center of gravity of the concrete pump and to check that the center of gravity of the concrete pump is contained within a previously determined volume.

3. The concrete pump according to claim 2, wherein the computer is configured to determine whether the center of gravity of the concrete pump is contained within an area bounded by the respective ends of the feet.

4. The concrete pump according to claim 3, wherein the concrete pump is equipped with a fifth device for detecting a concrete agglomerate inside the pipe.

5. The concrete pump according to claim 3, wherein the concrete pump is equipped with a sixth device for detecting electric lines.

6. The concrete pump according to claim 2, wherein the concrete pump is equipped with a fifth device for detecting a concrete agglomerate inside the pipe.

7. The concrete pump according to claim 2, wherein the concrete pump is equipped with a sixth device for detecting electric lines.

8. The concrete pump according to claim 1, wherein the concrete pump is equipped with a fifth device for detecting a concrete agglomerate inside the pipe.

9. The concrete pump according to claim 8, wherein the concrete pump is equipped with a sixth device for detecting electric lines.

10. The concrete pump according to claim 1, wherein the concrete pump is equipped with a sixth device for detecting electric lines.

11. The concrete pump according to claim 1, wherein the concrete pump is equipped an anemometer.

12. The concrete pump according to claim 1, wherein the concrete pump is equipped with wheels.

13. The concrete pump according to claim 1, wherein the concrete pump is equipped with tracks.

14. The concrete pump according to claim 1, wherein the concrete pump is a trailer adapted to be pulled by a motor vehicle comprising a second chassis adapted to receive the first chassis by securing.

* * * * *